United States Patent

[11] 3,619,472

| [72] | Inventor | William R. Davis Lakewood, Calif. |
|---|---|---|
| [21] | Appl. No. | 14,164 |
| [22] | Filed | Feb. 25, 1970 |
| [45] | Patented | Nov. 9, 1971 |
| [73] | Assignee | Cunningham-Davis Gardena, Calif. |

[54] GROUNDING ROLLER
9 Claims, 5 Drawing Figs.

[52] U.S. Cl. .................................................. 174/5 SG,
104/112, 105/150, 174/6, 191/53, 191/58, 191/63
[51] Int. Cl. ....................................................... H01r 3/00,
H01r 39/00, B60l 5/06
[50] Field of Search ............................................. 174/1, 5 R,
5 SG, 6, 40 R, 41; 191/12 R, 50, 52, 53, 57, 58, 63,
63.1–63.5; 104/89, 112, 115, 123, 182, 231;
105/150, 151, 152, 153; 317/2 R, 17; 254/134.3 R,
134.3 PA; 339/1 R, 6 RL, 21 S; 248/61, 55

[56] References Cited
UNITED STATES PATENTS

| 271,958 | 2/1883 | Waters | 191/53 X |
| 491,361 | 2/1893 | Kochs | 191/58 |
| 554,350 | 2/1896 | Stimpson | 191/58 X |
| 764,418 | 7/1904 | Briggs | 191/58 |
| 1,598,950 | 9/1926 | Wilcox | 191/63 |
| 2,847,521 | 8/1958 | Drummey | 191/58 |

FOREIGN PATENTS

| 16,521 | 1895 | Great Britain | 191/57 |

*Primary Examiner*—Laramie E. Askin
*Attorney*—Fulwider, Patton, Rieber, Lee & Utecht

ABSTRACT: Grounding roller apparatus including a frame in the form of an elongated spring member having an electrically conductive central roller mounted thereon and an outside electrically conductive roller disposed on either side thereof in spaced relationship therewith and also mounted on the frame. Thus, Thus, the central roller may be placed on an electrical conductor and the opposite ends of the frame flexed to engage the outer rollers on the underside of the conductor and the entire apparatus grounded whereby the conductor may be fed through the apparatus thereby providing a constant ground for the conductor.

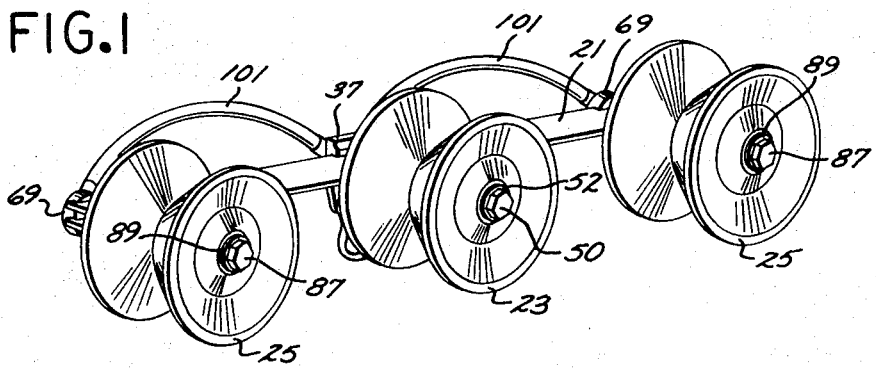
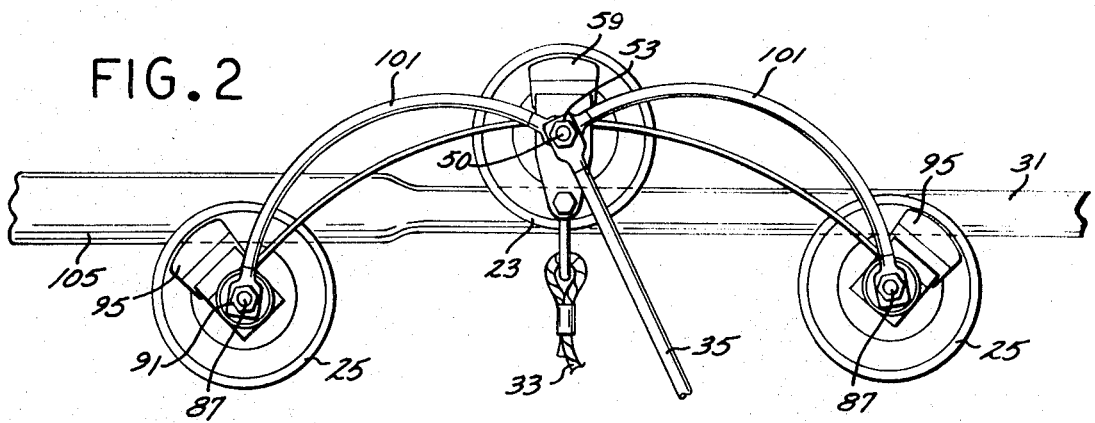
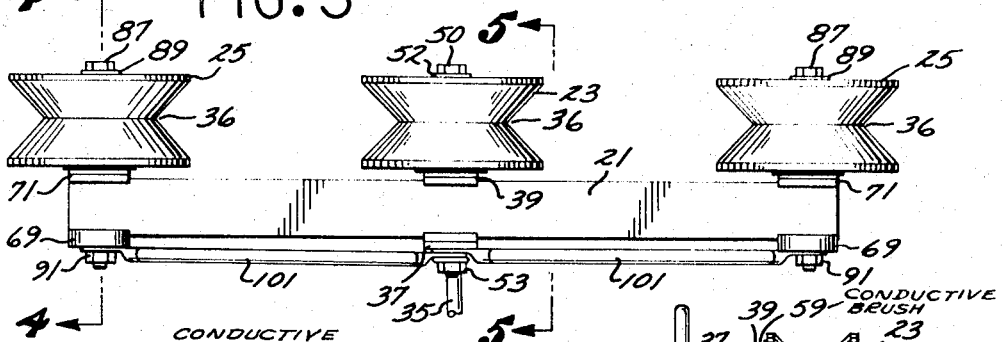
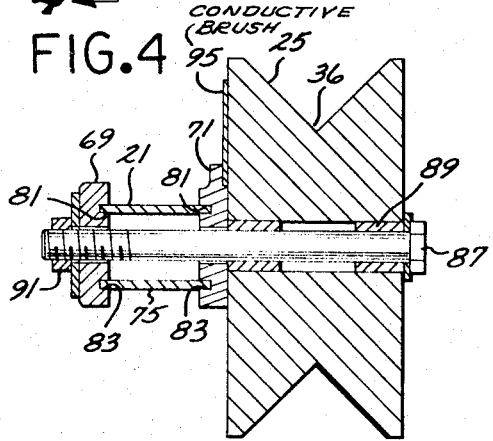
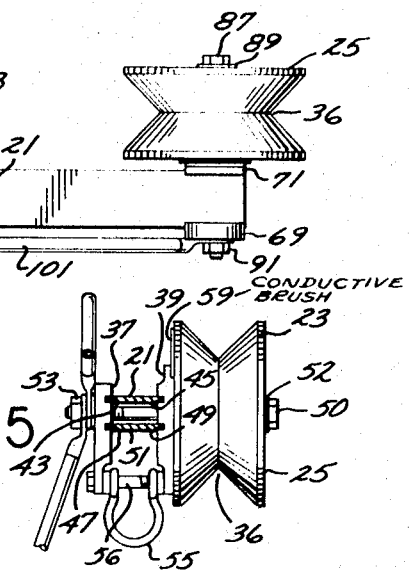

GROUNDING ROLLER

BACKGROUND OF THE INVENTION

1. Field of the Invention

The present invention relates to a device through which electrical conductors, such as power lines, may be fed during stringing thereof to provide a constant ground for such cables to maintain them discharged and protect workmen working thereon.

2. Description of the Prior Art

Grounding roller apparatuses have been proposed which include a frame mounting a pair of aligned rollers which engage an electrical conductor on one side an a third roller which engages the conductor on the opposite side and is biased toward the first two rollers to hold such conductor captive between the three rollers. A grounding device of this type is shown in U.S. Pat. No. 2,786,092. Grounding devices of this type suffer the shortcoming of being difficult to mount on the electrical conductor and that, once the rollers are set for passing a certain size conductor, they will not accommodate a substantial difference in conductor diameter without binding up or becoming disengaged from the conductor thereby rendering such devices unacceptable for use on conductors having splices therein.

SUMMARY OF THE INVENTION

The grounding roller apparatus of the present invention is characterized by a frame in the form of an elongated spring member. The apparatus includes a central electrically conductive roller with an outer electrically conductive roller disposed on either side thereof and arranged in alignment therewith, such rollers being mounted on the spring member. Thus, the central roller may be placed on the side of an electrical conductor and the opposite ends of the spring member flexed to engage the outer rollers on the opposite side of such conductor and such spring member will serve to maintain the rollers biased against the conductor to hold the apparatus captive on the conductor.

An object of the present invention is to provide a grounding roller apparatus of the type described which is straightforward in design and relatively economical to manufacture.

Another object of the present invention is to provide a grounding roller apparatus of the type described which is readily adjustable to many different diameter electrical conductors.

Another object of the present invention is to provide a grounding roller apparatus of the type described which adjusts automatically to accommodate variations in the diameter of the conductor being fed therethrough.

These and other objects and the advantages of the present invention will become apparent from a consideration of the following detailed description when taken in conjunction with the accompanying drawing.

DESCRIPTION OF THE DRAWING

FIG. 1 is a perspective view of a grounding roller apparatus embodying the present invention;

FIG. 2 is a side view of the grounding roller apparatus shown in FIG. 1;

FIG. 3 is a top view of the grounding roller apparatus shown in FIG. 1;

FIG. 4 is a vertical sectional view, in enlarged scale, taken along the line 4—4 of FIG. 3; and FIG. 5 is a vertical sectional view taken along the line 5—5 of FIG. 3.

DESCRIPTION OF THE PREFERRED EMBODIMENT

The grounding roller apparatus of the present invention includes a frame in the form of an elongated leaf spring 21 which has an electrically conductive central roller 23 mounted centrally thereon and an electrically conductive outer roller 25 mounted on either end thereof and disposed in alignment with such central roller when the spring frame 21 is in its unflexed position. Thus, the central roller 23 may be placed on an electrical conductor 31 as shown in FIG. 2 and the opposite ends of the frame 21 sprung downwardly to engage the outside rollers 25 underneath the conductor 31 to maintain the apparatus captive on such conductor. The apparatus may then be tethered to a vehicle, or the like, on the ground by means of a rope or cable 33 and may be grounded through an electrical grounding conductor 35. The electrical lead 31 may then be pulled through the apparatus and the rollers 23 and 25 will permit passage thereof while the tethering cable 33 anchors such apparatus against advancement with the conductor 31 and the grounding lead 35 maintains the conductor 31 grounded to provide an electrical path to the ground for any electrical charge to thereby protect workmen accidentally making contact with the conductor 31.

The rollers 23 and 25 have their peripheries formed with V-shaped grooves 35 for retention of the conductor 31.

The leaf spring frame 21 is in the form of a flat leaf spring and, as best seen in FIGS. 3 and 5, has its central portion sandwiched between a pair of electrically conductive roller-mounting brackets 37 and 39. The brackets 37 and 39 are formed with confronting grooves 43 and 45 in their respective upper extremities for receipt of the marginal edges of the leaf spring 21. The brackets 37 and 39 also have their lower extremities formed with respective notches 47 and 49 for receipt of the marginal edges of a spacer 51. The mounting brackets 37 and 39 are formed with aligned bores disposed between the spring frame 21 and spacer 51 and an electrically conductive axle bolt 50 projects through a bearing 52 in the roller 23 and through such bores, and has a nut 53 screwed on its threaded end to clamp such brackets 37 and 39 on the frame 21 and spacers 51.

Referring to FIG. 5, a stud 50 projects through a bore formed in the lower extremity of the wheel-mounting bracket 37 and screws into a threaded bore formed in the lower extremity of the wheel-mounting bracket 39. A tethering clevis 55 is carried by the stud 56 for receipt of the tethering cable 33 (FIG. 2).

Still referring to FIG. 5, an electrically conductive brush 59 is mounted to the upper extremity of the wheel-mounting bracket 39 and engages the electrically conductive central roller 23 for conducting electricity therefrom and into the bracket 39.

Referring to FIG. 4, the outer rollers 25 are mounted from the frame spring 21 by means similar to that for mounting the central roller 23. The mounting means includes electrically conductive outer and inner roller-mounting brackets 69 and 71, respectively, such brackets being formed with confronting upper and lower grooves 81 and 83 for receipt of the marginal edges of the leaf spring 21 and a spacer 75, respectively. The rollers 25 are then mounted by means of an electrically conductive axle bolt 87 which projects through a bearing 89 and through bores in the respective brackets 69 and 71 and has a nut 91 screwed on its outer extremity. Mounted from the upper extremity of the inner roller-mounting brackets 71 are electrically conductive brushes 95 which ride against such rollers and conduct electricity therefrom.

Referring to FIGS. 1 and 2, an insulated electrical lead 101 is connected between the mounting stud 50 of the central roller 23 and the mounting stud 87 of each of the outer rollers 25 whereby the grounding lead 35 may be connected with the central axle bolt 50 and will conduct current from all three rollers.

In operation, the roller apparatus of the present invention may conveniently be utilized for grounding an electrical conductor 31 while it is being strung from tower to tower, or the like. The roller apparatus may be mounted on the electrical conductor 31 by placing the central roller 23 on the conductor and flexing the opposite extremities of the spring frame 21 downwardly to engage the outer rollers 25 under such conductor. When the ends of the frame 21 are released such frame will unflex somewhat and bring the outer rollers 25 upwardly into engagement with the underside of the conductor 31 to bias it upwardly into the groove 36 of the central roller 23.

The roller apparatus may then be tethered to equipment on the ground by means of a cable 33 connected to the clevis 55. A grounding lead 35 is then connected to the axle bolt 50 of the central roller 23 to thereby provide a ground for such axle bolt and for each of the conductors 101 connected with the axle bolts 87 of the outer roller 25. Then, as the conductor 31 is fed through the roller apparatus, such roller apparatus will be maintained relatively stationary by the tethering cable 33 to thereby anchor such apparatus from moving along with the cable 31 being fed therethrough.

As the electrical conductor 31 is fed through the grounding roller apparatus, the electrically conductive rollers 23 and 25 will maintain contact with such conductor and any charge in the conductor 31 will be conducted off through the respective mounting brackets 39 and 71. The respective electrical brushes 59 and 95 will maintain rubbing contact with the respective wheels 23 and 25 to thereby facilitate conduction of current from the respective wheels 23 and 25 to the respective brackets 39 and 71. It will be appreciated that the force exerted by the spring frame 21 will act downwardly on the axle bolt 50 of the central roller 23 and will act upwardly on the axle bolts 87 of the end rollers 25 thereby causing the central roller to cock counterclockwise as viewed in FIG. 5 and the end rollers 25 to cock clockwise. This results in the conductor 31 running upwardly out of the apex of the grooves 36 and feeding through the grooves of the different rollers 23 and 25 at different diameters of the grooves thereby producing different rates of rotation for the different rollers and causing different ones of such rollers to skid on the conductor 31 to remove any oxide coats that may have formed thereon to cause the rollers 23 and 25 to maintain good electrical contact with such conductor. The current from the mounting brackets 71 of the outer rollers 25 will be conducted to the respective axle bolts 87 and through the electrical leads 101 to the axle bolt 50 of the central wheel 23 from where it will be discharged through the grounding lead 35.

It is of particular importance that the flexibility of the spring frame 21 enables the grounding roller apparatus of present invention to accommodate electrical conductors 31 of different diameters without necessitating adjustment. Further, when a splice 105 (FIG. 2) is encountered, the spring frame 21 will flex to enable the rollers 23 and 25 to accommodate the enlarged-in-diameter splice without danger of the apparatus riding off the electrical conductor 31.

From the foregoing detailed description it will be apparent that the grounding roller apparatus of the present invention is straightforward in design and economical to manufacture. Further, the grounding roller apparatus provides a positive ground for the electrical conductor on which it is utilized and is held securely on such conductor thereby enabling variations in diameter of the electrical conductor to be accommodated without danger of such conductor binding up in the apparatus or the apparatus becoming dislodged from the conductor.

Various modifications and changes may be made without departing from the spirit of the invention.

I claim

1. Grounding roller apparatus for being mounted on an electrical conductor and comprising:
    a central roller for being disposed on one side of said conductor;
    a pair of end rollers arranged on opposite sides of said central roller for being disposed on the side of said conductor opposite said one side, said end rollers being spaced longitudinally from said central roller;
    frame means including an elongated spring member disposed adjacent said rollers, mounting means mounting said frame from said rollers, said spring member being sufficiently flexible to enable said member to be flexed transversely sufficiently to enable said central roller to be engaged on said one side of said conductor and said end rollers to be engaged on said side of said conductor opposite said one side to hold said apparatus captive on said conductor;
    connector means mounted on said frame for connection with an electrically conductive cable; and
    electrically conductive means carried from said frame, connected with said connector means and conductively engageable with said conductor whereby said apparatus may be mounted on said conductor with said central roller disposed on said one side thereof and said end rollers disposed on said opposite side thereof and said connector connected with a conductive cable to enable said connector to be fed through said apparatus while said apparatus maintains said conductor in electrically conductive communication with said conductive cable.

2. Grounding roller apparatus as set forth in claim 1 wherein:
    said rollers are electrically conductive and are formed with peripheral grooves;
    said frame is disposed on one side of said rollers; and
    said mounting means includes respective elongated axle means connected on their respective one ends with said frame and connected on their opposite ends with said respective rollers whereby when said apparatus is mounted on said conductor said spring member will tend to cock said central roller in one direction and said end rollers in the opposite direction.

3. Ground roller apparatus as set forth in claim 2 wherein:
    said peripheral grooves are substantially V-shaped in cross section to cause said conductor to engage the grooves of different rollers at different diameters to cause said rollers to rotate at different rates as said conductor is drawn therepast to cause different one of said rollers to skid on said conductor to thereby assure good electrical contact between said rollers and conductor.

4. Grounding roller apparatus as set forth in claim 1 wherein:
    said rollers are electrically conductive and said apparatus includes;
    brushes carried by said frame and disposed in electrical contact with said rollers; and
    electrical leads connecting said brushes with said connector for conducting current from said rollers to said connector.

5. Grounding roller apparatus as set forth in claim 1 that includes:
    fastening means mounted on said frame for receipt of a tethering cable.

6. Grounding roller apparatus as set forth in claim 1 wherein:
    said spring member is in the form of a leaf spring.

7. Grounding roller apparatus as set forth in claim 1 wherein:
    said mounting means includes first and second mounting brackets for each of said rollers and disposed on opposite sides of said frame, said brackets being formed with slots receiving the marginal edges of said frame and bolt-receiving bores, said mounting means further including axle bolts extending through said rollers and said bolt-receiving bores and clamping said mounting brackets together.

8. Grounding roller apparatus as set forth in claim 7 wherein:
    said frame is sandwiched between the respective one extremities of said mounting brackets and said mounting means further includes respective spacers disposed between the opposite extremities of said respective mounting brackets.

9. Grounding roller apparatus as set forth in claim 1 wherein:
    said rollers are electrically conductive to conduct current from said conductor to said connector.

* * * * *